United States Patent [19]

Takiguchi et al.

[11] 4,446,467

[45] May 1, 1984

[54] HEAT-SENSITIVE RECORDING SHEET, AND A METHOD AND DEVICE FOR FIXING A RECORDED INFORMATION THEREON

[75] Inventors: Ryohei Takiguchi, Tokyo; Masayoshi Nagashima, Chigasaki, both of Japan

[73] Assignees: Dai Nippon Printing Co., Ltd., Tokyo; Tokyo Shibaura Denki Kabushiki Kaisha, Kawasaki, both of Japan

[21] Appl. No.: 347,340

[22] Filed: Feb. 9, 1982

Related U.S. Application Data

[62] Division of Ser. No. 174,443, Aug. 1, 1980, abandoned.

[30] Foreign Application Priority Data

| | | | |
|---|---|---|---|
| Aug. 3, 1979 | [JP] | Japan | 54-107358 |
| Aug. 3, 1979 | [JP] | Japan | 54-107359 |
| Aug. 3, 1979 | [JP] | Japan | 54-107360 |
| Aug. 3, 1979 | [JP] | Japan | 54-107361 |
| Oct. 8, 1979 | [JP] | Japan | 54-128816 |
| Oct. 8, 1979 | [JP] | Japan | 54-128817 |

[51] Int. Cl.³ .......... G01D 15/10

[52] U.S. Cl. .......... 346/76 PH

[58] Field of Search .......... 346/76 PH, 76 R; 355/100

[56] References Cited

U.S. PATENT DOCUMENTS

| | | | |
|---|---|---|---|
| 2,217,189 | 10/1940 | Süs | 430/151 |
| 2,813,043 | 11/1957 | Clark | 346/76 R X |
| 3,191,030 | 6/1965 | Huett et al. | 346/76 UX |
| 3,319,251 | 5/1967 | Reis | 346/76 X |
| 3,578,124 | 5/1971 | Flum | 194/4 R |
| 3,961,161 | 6/1976 | Ueda et al. | 235/61.11 F |
| 3,981,583 | 9/1976 | Tsuchida et al. | 355/100 |
| 4,168,845 | 9/1979 | Oeda et al. | 346/76 R X |

FOREIGN PATENT DOCUMENTS

| | | |
|---|---|---|
| 657 | 2/1979 | European Pat. Off. . |
| 2119696 | 8/1972 | France . |
| 51-43926 | 7/1976 | Japan . |
| 51-46946 | 7/1976 | Japan . |
| 51-108843 | 12/1976 | Japan . |

OTHER PUBLICATIONS

Chemical Abstracts, vol. 83, No. 6, Aug. 11, 1975, pp. 494–495 Abstract No. 50752f.

*Primary Examiner*—Donald A. Griffin

*Attorney, Agent, or Firm*—Cushman, Darby & Cushman

[57] ABSTRACT

A heat-sensitive recording sheet is proposed which has a heat-sensitive recording layer laminated on the surface of a support body and containing a diazosulfonate; a coupling agent; and a thermoplastic resin having a glass transition point of 70°-150° C. or a photocuring resin. A method for fixing a heat-sensitive recording is disclosed in which light of 400–550 nm in wavelength is irradiated on said heat-sensitive recording layer for optically activating it, a thermal head is used for heat-sensitive recording, and light of 300–450 nm in wavelength is irradiated on the recording layer for photofixing the recorded information. A device for effecting such heat-sensitive recording is also proposed.

11 Claims, 7 Drawing Figures

HEAT-SENSITIVE RECORDING SHEET, AND A METHOD AND DEVICE FOR FIXING A RECORDED INFORMATION THEREON

This is a division, of application Ser. No. 174,443 filed Aug. 1, 1980, abandoned.

BACKGROUND OF THE INVENTION

The present invention relates to a heat-sensitive recording sheet for heat-sensitive recording using a thermal head, and a method and device for fixing the information recorded in this manner.

Various non-impact type recording devices have been recently proposed. The demand for heat-sensitive recording devices as output devices for equipment such as information processors has increased since labor for maintenance or the like can be reduced to a minimum, no noise or other pollution is generated, and the construction of a heat-sensitive recording device is easy. For example, in a ticketing machine, this type of heat-sensitive recording device is used as a printing means for the tickets. However, since it is necessary to prevent alteration of tickets after issuing them and to secure the durability of the printing (especially in the case of a commutation ticket) for withstanding use over an extended period of time, a method has been desired which is capable of fixing the image after the heat-sensitive recording.

The thermally developing diazo-compound method is one example of a recording method which is capable of photofixing the recorded image. This method, however, is defective in durability. Among the thermally developing diazo-compound methods, the method which uses a recording material including a diazosulfonate offers the best advantages for heat-sensitive recording and photofixing due to the relative stability of the recording material in a dark environment.

Many studies have been made about the reaction of diazosulfonates to heat and light, and their optical behavior may be shown as follows:

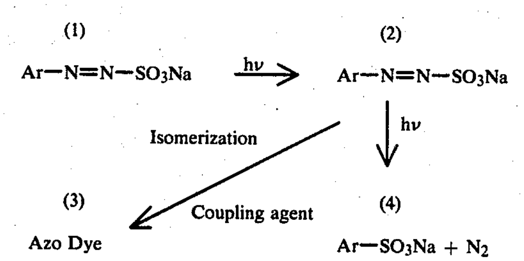

As a recording method utilizing these characteristics, techniques are disclosed in the U.S. Pat. No. 2,217,189 for decomposing the diazosulfonate in the exposed part by the reaction (1)→(2)→(4) for pattern exposure or obtaining an image by the reaction (1)→(2)→(3) for color formation of the unexposed part by heating. Further, in the Japanese patent publicatiion No. 51-43926, a method for producing the reaction (1)→(2)→(3) by simultaneously suppling light and heat is disclosed.

However, since a thermal head is generally used in heat-sensitive recording, and since there is a limit to the heat energy represented by the product of the temperature and time due to the service life of the thermal head, the above-mentioned methods cannot be utilized. In the method disclosed in the U.S. Pat. No. 2,217,189, the heat-sensitivity is low and the image density is low. In the method disclosed in the Japanese patent publication No. 51-43926, the fixing reaction (1)→(2)→(4) requires a large amount of exposure light and thus cannot be realized in ticketing machines.

SUMMARY OF THE INVENTION

The present invention has been made to overcome these problems of the prior art and has for one of its objects to provide a heat-sensitive recording printing sheet in which the durability of the recorded information is excellent and alteration of information is prevented.

Another object of the present invention is to provide a method for fixing a heat-sensitive recording, according to which a clear and stable image may be obtained even when the amount of heat energy supplied for the heat-sensitive recording process and the amount of light used for photofixing are small.

Still another object of the present invention is to provide a device for performing said method for fixing the heat-sensitive recording.

To the above and other ends, the present invention provides a heat-sensitive recording sheet which is characterized in that, on at least one surface of a sheet-like support body, is formed a heat-sensitive recording layer containing a diazolsulfonate; a coupling agent; and one resin selected from the group consisting of thermoplastic resins having glass transition points between 70° C. and 150° C. and photocuring resins.

The present invention further provides a method for fixing the heat-sensitive recording characterized by comprising the steps of:

forming, on at least one surface of a sheet-like support body, a heat-sensitive recording layer which contains a diazosulfonate, a coupling agent, and one resin selected from the group consisting of thermoplastic resins having glass transition points of 70°-150° C. and photocuring resins;

optically activating said heat-sensitive recording layer and performing heat-sensitive recording thereafter; and photofixing said heat-sensitive recording layer.

The present invention further provides a heat-sensitive recording fixing device comprising a feeding and transporting mechanism for feeding and transporting a recording material which has on its surface a heat-sensitive layer containing a diazosulfonate, a coupling agent and a photocuring binder or a thermoplastic binder; an exposing part for activating and fixing the heat-sensitive layer by exposing said recording material supplied by said feeding and transporting mechanism to light; a guiding part for supplying said recording material to said exposing part; and a printing part for heat-sensitive printing required visual information on said recording material which has been supplied to said exposing part for optical activation.

DETAILED DESCRIPTION OF THE PREFERRED EMBODIMENTS

Figure 1:
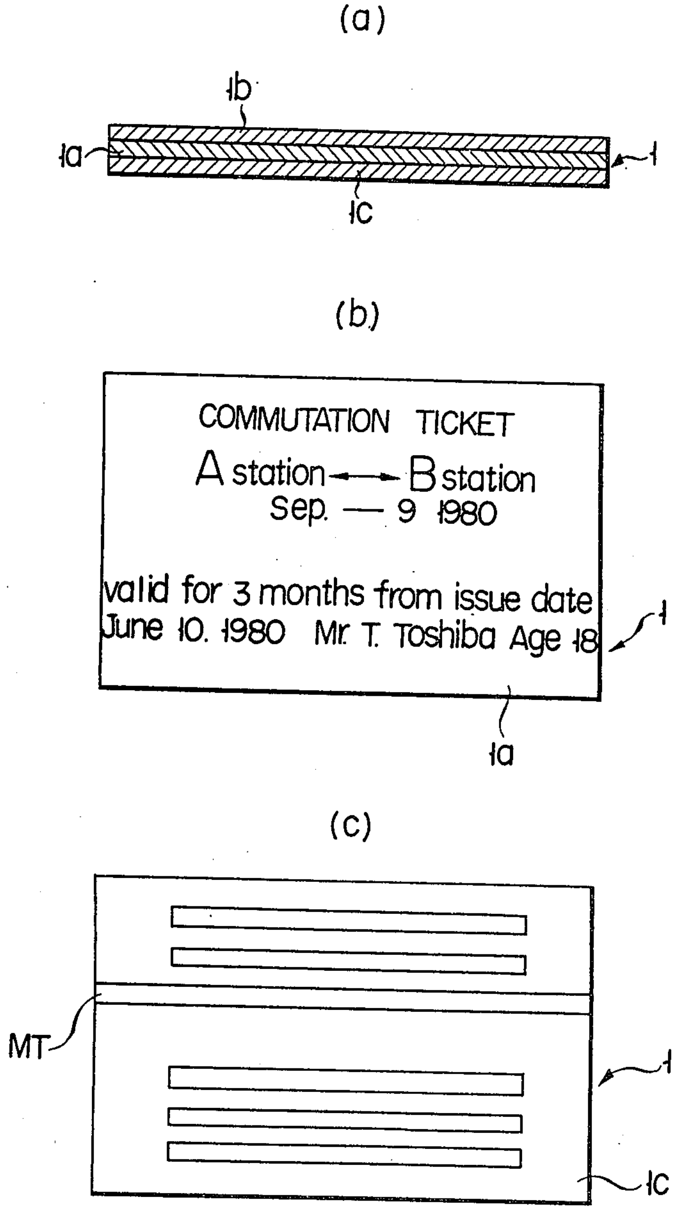
FIG 1*a* is a sectional view of a commutation ticket in accordance with one embodiment of the present invention.
FIG. 1*b* is a plan view of the same.
FIG. 1*c* is a rear view of the same.

The method of the present invention for fixing a heat-sensitive recording will first be described.

When a thermoplastic resin is used as a binder, the method comprises irradiating light on a heat-sensitive layer containing a diazolsulfonate, a coupling agent, and the thermoplastic resin binder so as to change the diazosulfonate unstable as represented by (2) and to effect an optical activation for improving the heat-sensitivity and photosensitivity; performing heat-sensitive recording on the activated heat-sensitive layer with a small amount of energy; and developing and photofixing this with a relatively small exposure to light. The most important part of this method is that by supplying energy in the process of optical activation, the amount of energy required for heat-sensitive recording and photofixing to be performed thereafter may be made less. Thus, the use of a diazosolfonate sensitizer with a heat-sensitive printer has been made possible.

The light source to be used for optical activation must have a wavelength of over 400 nm and preferably up to 550 nm; it may be a xenon lamp, a tungsten lamp, a mercury lamp, an arc lamp, a halogen lamp, or a fluorescent lamp for copying. It is preferable to use a filter which cuts out light of over 550 nm in wavelength. The light source to be used for photofixing must have a wavelength of 300–450 nm and may be selected from the above-mentioned light sources.

The energy for optical activation is 0.1–10 $J/cm^2$ and preferably 4–6 $J/cm^2$, and the energy for photofixing is 1–20 $J/cm^2$. Depending on the kind of diazosulfonate, the activating wavelength and fixing wavelength may be different from each other. In such a case, the same light source may still be used, but the amount of irradiating energy is varied to perform the method of the present invention. For example, when the ratio of the energy for optical activation and for photofixing is 1:2, energy is supplied in the ratio of 5 $J/cm^2$:10 $J/cm^2$.

The method of the present invention for fixing a heat-sensitive recording will now be described when a photocuring resin binder is used. Photocuring resins have relatively low thermal softening initiating temperature before irradiation of light which become very high by crosslinking, polymerization and so on. Due to this property, during heat-sensitive recording, the thermal reaction between the diazosulfonate and the coupling agent proceeds with good efficiency and, during photofixing, photocrosslinking and photopolymerization of the photocuring resin are effected as the photolysis of the diazosulfonate is effected, so that the heat-sensitive recording layer of the recording surface may be able to withstand abrasion and the influence of solvents.

Thus, by using a photocuring resin as the binder for the heat-sensitive recording layer, the recording characteristics, especially the color forming ability, are improved to the same degree or more than in the case of a thermoplastic resin, the strength of the recording layer after recording may be improved, and use over extended periods of time is satisfactory.

Further, as in the case in which a thermoplastic resin is used as described above, when a photocuring resin is used it is preferable to optically activate the resin with a light which will not cure the resin before heat-sensitive recording, although this is not absolutely necessary. Especially when the method is applied for use with a heat-sensitive printer, optical activation is advantageous since it is preferable that the energy required for heat-sensitive recording be less.

The wavelength and type of light source to be used for optical activation may be the same as in the case in which a thermoplastic resin is used. It must be noted that if the photocuring resin is cured at this stage, the heat-sensitive color forming ability is degraded. Thus, in order to obtain printing of higher density, special care must be taken with respect to the wavelength of the irradiating light.

The light source to be used for decomposing the diazosulfonate which has not undergone color formation must have a wavelength of 300–450 nm and may be selected from the above-mentioned types.

Ultraviolet light which cures photosensitive resins is below 400 nm in wavelength and may be irradiated from a light source selected from the above-mentioned types.

The two kinds of light for fixing as described above may be irradiated at the same time or separately. In the latter case, the order of irradiation may be arbitrarily selected.

Ultraviolet light (of a wavelength shorter than 400 nm) for curing the resin also has the ability to decompose the diazosulfonate, so that a single light source may be employed for photofixing and optical activation, and photodecomposition may be performed with the same wavelength and different energy levels. In summary, the light sources for optical activation and photofixing may be chosen depending on the characteristics of the diazosulfonate, the coupling agent and the photocuring resin used.

The energy for optical activation and the energy for photofixing may be the same as those in the case in which a thermoplastic resin is used as described above.

The thermal head used in the heat-sensitive recording of the present invention can be of any type including dot-type (line or matrix), segment type, and thermal-type or hot-pen type. The thermal energy necessary for the recording is from 0.4–10 W/1–3 msec per dot ($260\mu \times 130\mu$).

The method of the present invention for fixing a heat-sensitive recording improves the print quality of printed media by enabling thermal printing with high pigment concentration and results in high durability of the recordings. Accordingly, it is suitable for recordings which may come in contact with water, oil or various other chemicals, and for documents such as commutation tickets and coupon tickets which are repeatedly used.

Diazosulfonates that can be used for the recording layer of the present invention are compounds expressed by the following general formula:

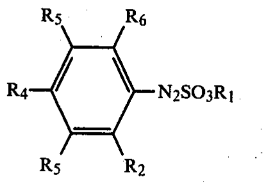

where $R_1$ stands for an alkali metal; $R_2$, $R_3$, $R_5$ and $R_6$ each stand for hydrogen, a halogen, or an alkyl or alkoxy group; $R_4$ stands for hydrogen, a halogen, alkyl, amino, benzoylamino, morpholino, tolylmercapto or pyrrolidino group. Various of these diazosulfonates are known and are obtainable by treating respective corresponding diazonium salts with a metal nitrite. Particularly suitable are compounds wherein $R_4$ is an amino, benzoylamino, morpholino, tolylmercapto or pyrrolidino group; $R_2$ and $R_5$ are each hydrogen; and $R_3$ and $R_6$ are each a methoxy, ethoxy or butoxy group. These are the diazosulfonates obtained from diazonium salts conventionally used in wet diazocopy. Such compounds include:

Sodium benzenediazosulfonates having such substituting groups as 2-methoxy; 2-phenoxy; 2-methoxy-4-phenoxy; 2,4-dimethoxy; 2-methyl-4-methoxy; 2,4-dimethyl; 2,4,6-trimethyl; 2,4,6-trimethoxy; 2,4-dimethoxy-5-chloro; 2-methoxy-5-nitro; 2-methoxy-5-acetoamido; 2-methoxy-5-N,N-diethylsulfonamido; 2-methoxy-5-N-phenylcarbamyl; 3-methyl; 4-methyl; 4-methoxy; 4-ethoxy; 4-phenyl; 4-phenoxy; or 4-acetamido;

or sodium benzenediazosulfonates having substituting groups such as 4-(N-ethyl,N-benzylamino); 4-(N,N-diemthylamino); 4-(N,N-diethylamino); 4-(N,N-diethylamino)-3-chloro; 4-(N-ethylamino)-3-methyl; 4-(N,N-diethylamino)-2-methyl; 4-(N-ethyl,N-α-hydroxyethylamino); 4-pyrrodilino-3-chloro; 4-pyrrodilino-3,5-dichloro; 4-morpholino; 4-morpholino-3-chloro, 4-l morpholino-2-methoxy; 4-morpholino-2,5-diethoxy; 4-morpholino-2,5-dibutoxy; 4-(4'-tolylmercapto)-2,5-dimethoxy; 4-(4'-tolylmercapto)-2,5-diethoxy; 4-(4'-methoxybenzoylamino)-2,5-dibutoxy; or 4-diphenylamino groups.

The coupling agents used in combination with the above diazosulfonates can be selected from various known compounds. These include:

Resorcinol and its derivatives such as 4-benzoylresorcinal, 2-methylresorcinol, 5-methyl resorcinol, diresorcinol and resorcinol sulfide; phloroglucinol and its derivatives such as phloroglucide formic ester and phloroglucide acetic ester;

pyrazolones such as polyresorcinol pyrazolone, 1-phenyl-3-methylpyrazolone and 4,4'-bis(1-phenyl-3-methyl-5-pyrazolone);

naphthol derivatives such as 2-hydroxyl-3-naphthoic acid-2'-ethoxyanilide; 2-hydroxy-3-naphthoic acid-2',5'-dimethoxyanilide; 2-hydroxy-3-naphthoic acid-2'-methoxy-5'-nitroanilide; 2-hydroxy-3-naphthoic acid-2'-methyl-4'-chloroanilide; 2-hydroxy-3-naphthoic acid-morpholinopropioamide; 2-hydroxy-3-naphthoic acid-ethanolamide;- dihydroxynaphthalene; 2-hydroxy-3-naphthoic acid naphthamide; sodium 1,8-dihydroxynaphthalene-3 (or 4)-sulfonate; sodium 1-hydroxy-8-benzoylaminonaphthalene-3-sulfonate; sodium 1-hydroxy-8-phenylaminonaphthalene-4-sulfonate; sodium 1-hydroxy-8-methylaminoaphthalene-5-sulfonate; sodium 1-hydroxynaphthalene-4-sulfonate; and sodium 2,8-dihydroxynaphthalene-6-sulfonate;

acidic coupling agents such as 2-hydroxy-3-naphthoic acid; 2-hydroxy-6-naphthoic acid; 2-hydroxy-1-naphthoic acid; 2,6-dihydroxybenzoic acid; 2,4-dihydroxybenzoic acid; 3,5-dihydroxybenzoic acid; 2,4,6-trihydroxybenzoic acid; and cyanocetic acid; or m-hydroxyphenylurea; N,N'-ethylenebisacetoacetoamide; 2,6-dihydroxyacetophenone; acetoacetoanilide; 2,4,6-trihydroxyacetophenone; N-benzylacetoacetoamide; catechol; 5,5-dimethyl-1,3-cyclohexanedione; and benzamide acetoacetate;

or other usable compounds such as 2,4-dihydroxybenzoic acid-ethanolamide; 3,5-dihydroxybenzoic acid-ethanolamide; 4-hydroxycoumalin; 2,5-dimethyl-4-morpholinomethylphenol; and 8-oxyquinoline.

A thermoplastic binder of any kind can be used unless it affects the pH of the heat-sensitive layer when it is formed. For example: Acrylic resins such as polymethacrylate ester and acrylate ester-methacrylate ester copolymer; cellulose derivatives such as nitrocellulose, cellulose acetate, cellulose acetate-butyrate, ethylcellulose and hydroxyethylcellulose; vinyl acetate resins and their derivatives such as polyvinyl acetate, polyvinyl alcohol, polyvinyl formal, and polyvinyl butyral; and vinyl polymers of cyclic nitrogen compounds such as polyvinylpyrrolidone and polyvinylcarbazone; and other polycarbonate resins. Most preferable are those having glass transition points between 70° C. and 150° C. Resins with glass transition points lower than 70° C. are not suitable for a heat-sensitive recording layer due to deposit of molten resin on the thermal head, though recording of high color intensity is possible by active molecular movement of the chromophore molecules during the heat-sensitive recording. Resins with glass transition points higher than 150° C., on the contrary, have drastically reduced color formation because the heat provided by the thermal head is not sufficient to induce adequate movement of the chromophore molecules. Accordingly, as the binder for a heat-sensitive recording device, use of a resin having a glass transition point between 70° C. and 150° C. is desirable.

Commercially available thermoplastic resins of comparatively high glass transition points are listed below with their glass transition points:

| | |
|---|---|
| Polymethylmethacrylate | 60–105° C. |
| Polyacrylic acid | 80–95° C. |
| Polycyclohexylacrylate | 66–88° C. |
| Polystyrene | 80–100° C. |
| Polydivinylbenzene | 106° C. |
| Polyvinyl alcohol | 68–85° C. |
| Polymethylchloroacrylate | 84–100° C. |
| Polyacylonitrile | 80–100° C. |
| Polyethylene-1,5-naphthalate | 71° C. |
| Polyethylene-2,6-naphthalate | 113° C. |
| Triacetylcellulose | 30, 105° C. |

A photosensitive resin binder which cures by the irradiation of ultraviolet light preferably has a thermal softening initiating temperature of between 80° C. and 200° C. With a thermal softening initiating temperature of lower than 80° C., the temperature of the thermal head instantly reaches 200° C. to 350° C. causing blurred printing or imperfect printing of letters due to the adherence of the molten binder or the color former from the recording layer. It may also cause an interruption of printing by accumulation of work-up after a long duration of printing. With a thermal softening initiating temperature higher than 200° C., the movement of the chromophore molecules cannot be readily induced by the heat from the thermal head, resulting in reduced color formation. Some photocuring resins have thermal softening initiating temperatures exceeding 200° C. In such cases it is desirable to adjust the thermal softening initiating temperature by admixing with the photocuring resin an acrylic resin such as polymethacrylic ester, or a cellulose derivative such as nitrocellulose, or another thermoplastic resin in an amount up to, for example, 50% by weight (relative to the total weight).

Concrete examples of photocuring resins usable in the present invention are mentioned below.

The most important group belongs to cinnamic acid derivatives, typical of which are polyvinyl cinnamate, cinnamic esters of ethylene-vinylalcohol copolymer, cinnamic esters of Glyptal resin, cinnamic esters of epoxy resin, cinnamic esters of polyether, cinnamoyl type polymers with styrenic structure, cinnamoyl type acrylic polymers, cinnamic esters of styrene-maleic anhydride copolymer, polyvinylcinnamylidene acetate, polyvinylbenzylacetophenone and polyvinylstyrylketone.

The other group of photocuring resins, called azide type photopolymers, includes polyvinyl-p-azidobenzoate, polyvinyl-p-azidobenzal, polymers obtained by condensation of m-nitrobenzaldehyde and phenol, and polymers obtained by esterification of polyvinyl alcohol using p-azidocinnamic acid. Further, polymers having o-naphthoquinonediazide residues which belong to diazo-type photopolymers, or polymers having maleimide residues as photosensitive groups can also be used.

The photosensitivity of photosensitive resins can be improved by the use of a sensitizer, whereby photofixing can be conducted easily with a small amount of energy. Examples of useful sensitizers are: 5-nitroacenaphthene; N-acetyl-4-nitro-1-naphthylamine; p,p'-tetramethyldiaminobenzophenone; 9-fluorenone; p-nitroaniline; p-nitrodiphenyl; 2,4-dinitroaniline; 2-chloro-4-nitroaniline; 2,6-dichloro-4-nitoroaniline; anthraquinone; 1,2-benzanthraquinone; and picramide.

When the heat-sensitive and photosensitive layer of the recording material sticks to the thermal head of a thermal printer, problems arise such as imperfect printing of letters. To prevent such problems, incorporation of a lubricant and a mold-releasing agent in the heat-sensitive and photosensitive layer is recommended. In the case of dot-line type thermal printers wherein pressure is applied upon thermal printing, causing a high degree of friction between the recording material and the thermal head, the use of a lubricant and mold-releasing agent is particularly effective.

Useful lubricants agents are typically metal soaps, i.e. metal salts of aliphatic acids such as lauric or stearic acid. The following substances are also useful:

- Organic tin salts of aliphatic acids such as dibutyltin-dilaurate and dibutyl-tin-dinonylate;
- aliphatic acid amides such as stearylamide, palmitylamide, oleylamide and bis aliphatic acid amide;
- high ketones like stearone;
- high alcohols and derivatives such as myristyl alcohol, cetyl alcohol, stearyl alcohol, polyethyleneglycol and polyglycerol;
- hydrocarbons such as liquid paraffin, parraffin wax, microwax, low-molecular polyethylene; and
- natural waxes such as carnauba wax, candililla wax, beeswax, spermaceti wax, Chinese wax and montan wax.

The mold-releasing agents used in the present invention are those used generally in processing rubber and plastics for the purpose of improving the mold-releasing property. Various substances can be used as mold releasing agents, of which the main substances are:

- Mineral oils such as petroleum ether;
- vegetable oils such as olive oil and castor oil;
- vaseline or lanolin;
- aliphatic acids particularly alkanic or alkenic acids having 11 to 24 carbon atoms, and their esters, especially esters with alkyl or alkenyl groups having 6 to 24 carbon atoms;
- phosphite esters, particularly with phenyl or alkyl groups (of 8 to 13 carbon atoms);
- aliphatic esters of glycerin-sorbitol condensation products;
- alkenoyl (of 7 to 21 carbon atoms) aminoacid esters; and
- fluorocarbons, Teflon, and silicones.

The recording material may be obtained by painting on a support body a heat-sensitive and photosensitive composition containing the above components.

For the raw material of the support body, an arbitrarily selected paper or film sheet may be used as long as it does not change the pH of the heat-sensitive layer. Characteristics which are preferable for the support body are evenness, heat-resistance, and impermeability to the sensitizer ink. Thus, it is preferably to use a surface-treated paper sheet such as a coated paper or an art paper, and it is effective to use a sealer. If a plastic film is desired, it is better to select a polyester or triacetate film which has relatively good heat-resistance.

The means for applying the heat-sensitive layer to this support layer are preferably the roll coating method or gravure coating method.

In the method of the present invention for fixing a heat-sensitive recording, since thermal recording is performed after raising the heat-sensitivity and photo sensitivity by optically activating the sensitizer as described hereinbefore, clear printing may be effected with a smaller amount of energy, and a stable and durable image may be obtained by a simple photofixing. Thus, the method provides a recording and fixing method suitable for the output devices of information processors, ticketing machines and so on which require printing at high speed.

EXAMPLE 1

| | | |
|---|---|---|
| A | Diazosulfonate: Sodium benzenediazosulfonate having a 4-(4'-tolylmercapto)-2,5-diethoxy group | 3 g |
| | Methyl cellosolve | 9 g |
| B | Coupling agent: 2-hydroxy-3-naphthoic acid | 2 g |
| | Methyl cellosolve | 6 g |
| C | Thermoplastic resin binder: Polymethylmethacrylate (Sumipex B-MHO (trade name), glass transition point 115° C.) | 5 g |
| | Methyl ethyl ketone | 67 g |

The solutions shown under items A–C were mixed immediately before coating. The compositions were painted by the roll coating method on a coated paper (Top coat manufactured by KANZAKI PAPER MFG. CO., LTD.) in the amount of 50 g/$m^2$ (the coated amount of the diazosulfonate was 1 g/$m^2$). Drying was performed at a temperature of 60° C. for one minute.

Light from a xenon flashing lamp was irradiated in the amount of 5 J/$m^2$ on the entire surface of a recording paper sheet thus obtained to optically activate it. Heat-sensitive recording was performed using a dot-type thermal head. The conditions were such that a voltage of 15 V was applied for a period of 50 msec. A clear blue image with no imperfect part was obtained.

Light from a diazocopying chemical lamp was then irradiated on the surface for 120 seconds to effect fixing, and areas other than the image were then whitened. Recording was impossible when the recording material was reheated, and thus the image was fixed.

EXAMPLE 2

| | | |
|---|---|---|
| A | Sodium benzenediazosulfonate having a 4-(4'-tolylmercapto)-2,5-diethoxy group | 3 g |
| | Methyl cellosolve | 9 g |
| B | Phloroglucinol | 2 g |
| | Methyl cellosolve | 6 g |
| C | Sumipex B-MHO (polymethylmethacrylate) | 5 g |
| | Methyl ethyl ketone | 57 g |

The solutions shown above were mixed and coated in a similar manner as in Example 1. After the heat-sensitive recording process, a brown image with no defects was obtained. Fixing was performed in a similar manner.

EXAMPLE 3

| | | |
|---|---|---|
| A | Sodium benzenediazosulfonate having a 4-benzoylamino-2,5-diethoxy group | 3 g |
| | Methyl cellosolve | 9 g |
| B | 2-hydroxy-3-naphthoic acid | 2 g |
| | Methyl cellosolve | 6 g |
| C | Sumipex B-MHO (trade name) (polymethylmethacrylate) | 5 g |
| | Methyl ethyl ketone | 57 g |

Optical activation was effected by a xenon flashing lamp (5 J/$cm^2$) in a similar manner as in Example 1, and a clear image was obtained when heat-sensitive recording was performed using a dot-line type thermal head. After fixing using a diazocopying chemical lamp, reformation of color was not observed when the recording material was exposed to the flame of a lighter.

EXAMPLE 4

| | | |
|---|---|---|
| A | Sodium benzenediazosulfonate having a 4-(4'-tolylmercapto)-2,5-diethoxy group | 3 g |
| | Methyl cellosolve | 9 g |
| B | 2-hydroxy-3-naphthoic acid | 2 g |
| | Methyl cellosolve | 8 g |
| C | Sumipex B-MHO (trade name) | 5 g |
| | Methyl ethyl ketone | 57 g |
| D | Polyethylene wax (AF wax (BASF, trade name), mp. 82-86° C.) | 1 g |
| | Toluene | 3 g |

The solutions shown under items A-D were mixed and were immediately painted by a roll coater onto a coated paper at the rate of 50 g/$m^2$ (the coated amount of the diazosulfonate was 1 g/$m^2$).

The recording paper sheet thus obtained was optically activated (5 J/$cm^2$) by irradiation by a xenon flashing lamp as in Example 1. Heat-sensitive recording was then performed using a thermal head of segment type. The printing conditions were such that a voltage of 15 V was applied for 50 msec. The blue image thus obtained was clear, and no imperfect part was noted. The image was made to pass under a diazocopying chemical lamp for 120 seconds, and the blue image alone remained to complete the fixing process.

EXAMPLE 5

| | | |
|---|---|---|
| A | Benzenediazosulfonate having a 4-(N—ethyl-N—benzyl)amino group | 3 g |
| | Methyl cellosolve | 9 g |
| B | 2-hydroxy-3-naphthoic acid | 2 g |
| | Methyl cellosolve | 8 g |
| C | Sumipex B-MHO (trade name) | 5 g |
| | Methyl ethyl ketone | 67 g |
| D | Polyethylene wax (AF wax) | 1 g |
| | Toluene | 3 g |

A recording paper sheet was prepared as in Example 4. After the recording material was optically activated by a xenon flashing lamp, heat-sensitive recording was performed using a dot-type thermal head as in Example 1. A blue image with no imperfect part was obtained. The fixing was performed by subjecting the image to a xenon flashing lamp three times (5 J/$cm^2$) until areas other than the image changed from yellow to white.

EXAMPLE 6

| | | |
|---|---|---|
| A | Sodium benzenediazosulfonate having a 4-(4'-tolylmercapto)-2,5-diethoxy group | 3 g |
| | Methyl cellosolve | 9 g |
| B | Phloroglucinol | 2 g |
| | Methyl cellosolve | 8 g |
| C | Sumipex B-MHO (trade name) | 5 g |
| | Methyl ethyl ketone | 67 g |
| D | Polyethylene wax (AF wax) | 1 g |
| | Toluene | 3 g |

A recording paper sheet obtained with the heat-sensitive composition shown above was optically activated in a manner similar to that of Example 1, and heat-sensitive recording was performed using the thermal head used in Example 4. A clear brown image was thus obtained and was fixed in a manner similar to the preceding examples.

EXAMPLE 7

| | | |
|---|---|---|
| A | Diazosulfonate: Sodium benzenediazosulfonate having a 4-(4'-tolylmercapto)-2 5-diethoxy group | 3 g |
| | Methyl cellosolve | 9 g |
| B | Coupling agent: 2-hydroxy-3-naphthoic acid | 6 g |
| | Methyl cellosolve | 18 g |
| C | Photosensitive resin: polyvinyl cinnamate (TPR-101, TOKYO OHKA KOGYO CO., LTD. trade name) | 4.5 g |
| | Methyl cellosolve | 14 g |
| D | Lubricant: Polyethylene wax (AF wax) | 1 g |
| | Toluene (dispersing medium) | 3 g |
| E | Mold-releasing agent: Fluorocarbon (Moldwiz F-57, manufactured by Axel Co., LTD.) | 0.1 g |
| | Toluene (dispersing medium) | 1 g |
| F | Methyl ethyl ketone | 50 g |

The solutions shown under the items A-C above were mixed immediately before being painted by the roll coating method onto a coated paper (Top coat manufactured by KANZAKI PAPER MFG. CO., LTD.) in the amount of 50 g/$m^2$ (the coated amount of the diazosulfonate was 1 g/m$^2$). Drying was performed at a temperature of 60° C. for 20 seconds.

The entire surface of the recording material thus obtained was subjected to irradiation by a xenon flashing lamp (5 J/cm$^2$) for optical activation, and heat-sensitive recording was performed by a heat-sensitive printer. The thermal head used was of the dot-line type, and the applied energy was about 0.7 W/dot.

The entire surface of the recording material was then subjected to irradiation from a high voltage mercury lamp for two minutes for photofixing. That is, the diazosulfonate which has not undergone color formation was decomposed so as to whiten the areas other than the image, and the photosensitive resin was cured.

Durability tests were conducted with respect to resistance to alcohol, washability, and color fastness. The recording material was superior in every respect to the recording material using a thermoplastic resin.

EXAMPLE 8

| | | |
|---|---|---|
| A | Sodium benzenediazosulfonate having a 4-(N—ethyl-N—benzylamino) | 3 g |
| | Methyl cellosolve | 9 g |
| B | 2-hydroxy-1-naphthoic acid | 6 g |
| | Methyl cellosolve | 18 g |
| C | Azide polymer (A-101, Shinko Technical & Research Co., Ltd.) | 4.5 g |
| | Methyl cellosolve | 14 g |
| D | Polyethylene wax (AF wax) | 1 g |
| | Toluene (dispersing medium) | 3 g |
| E | Hostaflon TF9205 (Hoechst, trade name) | 0.1 g |
| | Toluene (dispersing medium) | 0.05 g |
| | Cellulose Acetate Butylate (CAB-381-05 Eastman Kodak, trade name) | 0.5 g |
| F | Methyl ethyl ketone | 50 g |

A recording material having a heat-sensitive layer of the above composition was prepared as in Example 7.

A purplish red image of good quality was obtained by heat-sensitive recording. After undergoing photofixing by a high voltage mercury lamp, the recording material showed excellent chemical resistance and color fastness.

EXAMPLE 9

| | | |
|---|---|---|
| A | Sodium benzenediazosulfonate having a 4-(4'-tolylmercapto)-2,5-diethoxy group | 3 g |
| | Methyl cellosolve | 9 g |
| B | 2-hydroxy-3-naphthoic acid | 6 g |
| | Methyl cellosolve | 18 g |
| C | Polyvinyl cinnamate | 4.5 g |
| | Methyl cellosolve | 14 g |
| D | 5-nitroacenaphthene | 0.1 g |
| | Methyl ethyl ketone | 50 g |
| E | Polyethylene wax AF | 1 g |
| | Toluene (dispersing medium) | 3 g |
| F | Hostaflon TF9205 | 0.1 g |
| | Cellulose Acetate Butylate (CAB-381-05) | 0.05 g |
| | Toluene (dispersing medium) | 0.5 g |

The solutions shown under items A–F were each prepared and painted on a coated paper in a manner similar to Example 1. After drying, the recording material thus obtained underwent heat-sensitive recording, and a clear blue image was obtained.

This image showed improved durability upon photofixing, and the resistance to alcohol and color fastness were excellent.

A device for fixing the recorded information according to any of the above heat-sensitive recording fixing methods will now be described.

Description of the embodiment to be described below will be made wth reference to a case in which the present invention is applied to a ticketing machine, for example, a ticketing machine for commutation tickets.

FIGS. 1(*a*), 1(*b*), and 1(*c*) are a sectional view, a plan view and a rear view, respectively, of a commutation ticket issued by the device of the present invention. A commutation ticket is issued by printing a required piece of information on a card 1 which is an element of a ticket. The card 1 is prepared in accordance with a suitable method from Examples 1–9. For example, on one surface of a base material 1*a* of a polyester film is coated a heat-sensitive composition as mentioned hereinbefore to form a heat-sensitive layer 1*b*. A magnetic film or the like is attached in advance to the other surface of the base material 1*a* to provide the card 1 having a magnetic recording layer 1*c*. Required information is recorded in the magnetic recording layer 1*c*, as shown in FIG. 1(*b*). Six magnetic recording tracks MT are formed in the magnetic recording layer 1*c*, and required pieces of information such as clock signals as the reference signal for a reading out process, the departing and terminating stations and so on are magnetically recorded. Magnetic recording is performed in addition to heat-sensitive recording so that unattended examination of such a commutation ticket by an automatic ticket examining machine is possible in addition to conventional examination by a ticket clipper.

Figure 2:
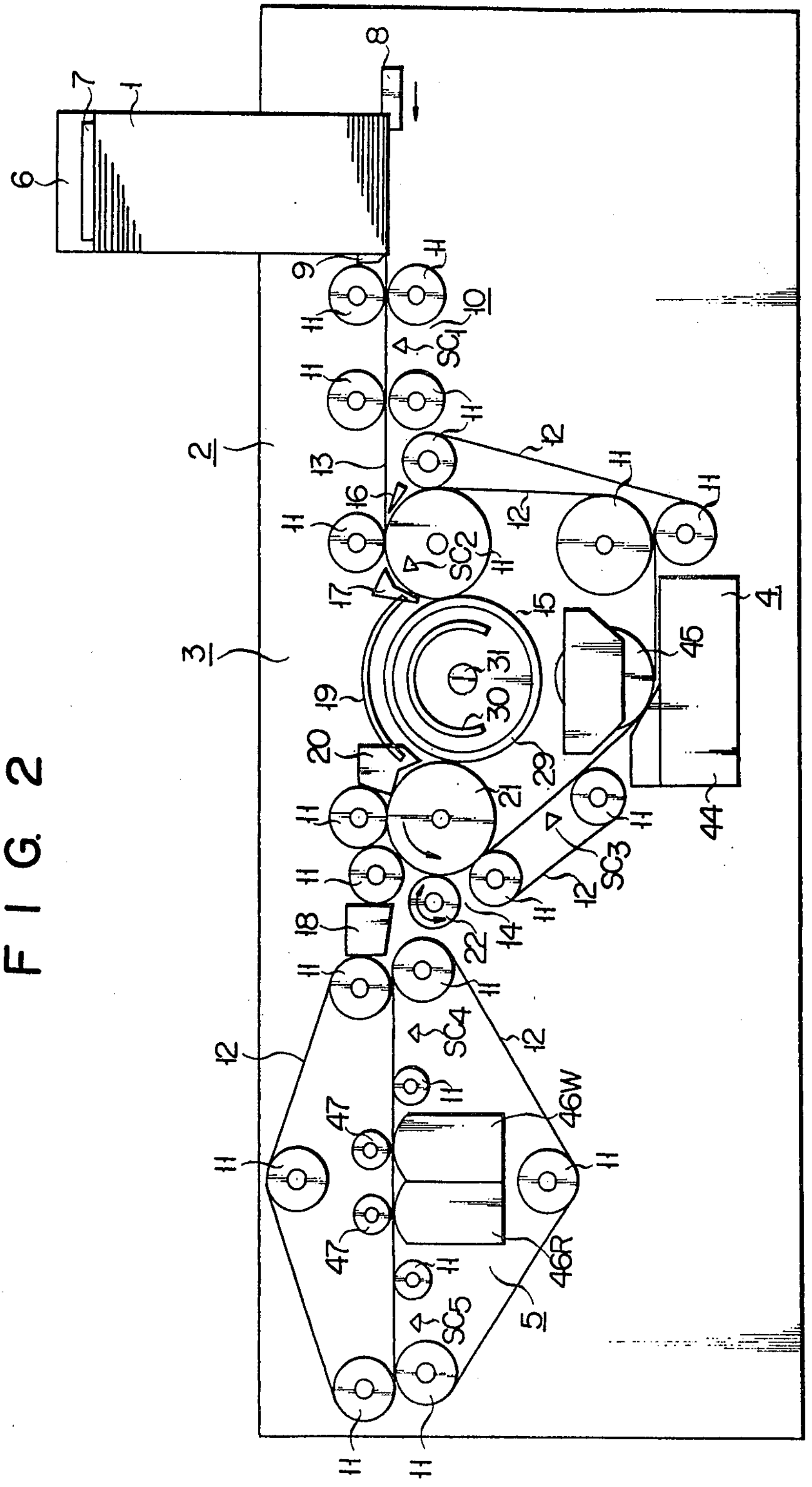
FIG. 2 is a schematic view of a heat-sensitive recording fixing device in accordance with another embodiment of the present invention.

FIG. 2 is a schematic front view of the device of the present invention.

The device of the present invention roughly comprises a card supplying and transporting mechanism 2, an exposing part 3, a printing part 4 and a magnetic recording part 5. The card supplying and transporting part 2 comprises a hopper 6 which encases a number of stacked cards 1 prepared in the manner described above, a weight 7 for downwardly pressing the cards 1 encased in the hopper 6, a picker 8 for forwarding the card 1 downwardly pressed by this weight 7, a throat knife 9 for regulating the thickness of the card so as to supply one card 1 at a time forwarded by the picker 8, a transporting part 10 for pooling the individually supplied card 1 once and then transporting it, and a transport path 13 defined by rollers 11 and belts 12.

Figure 3:
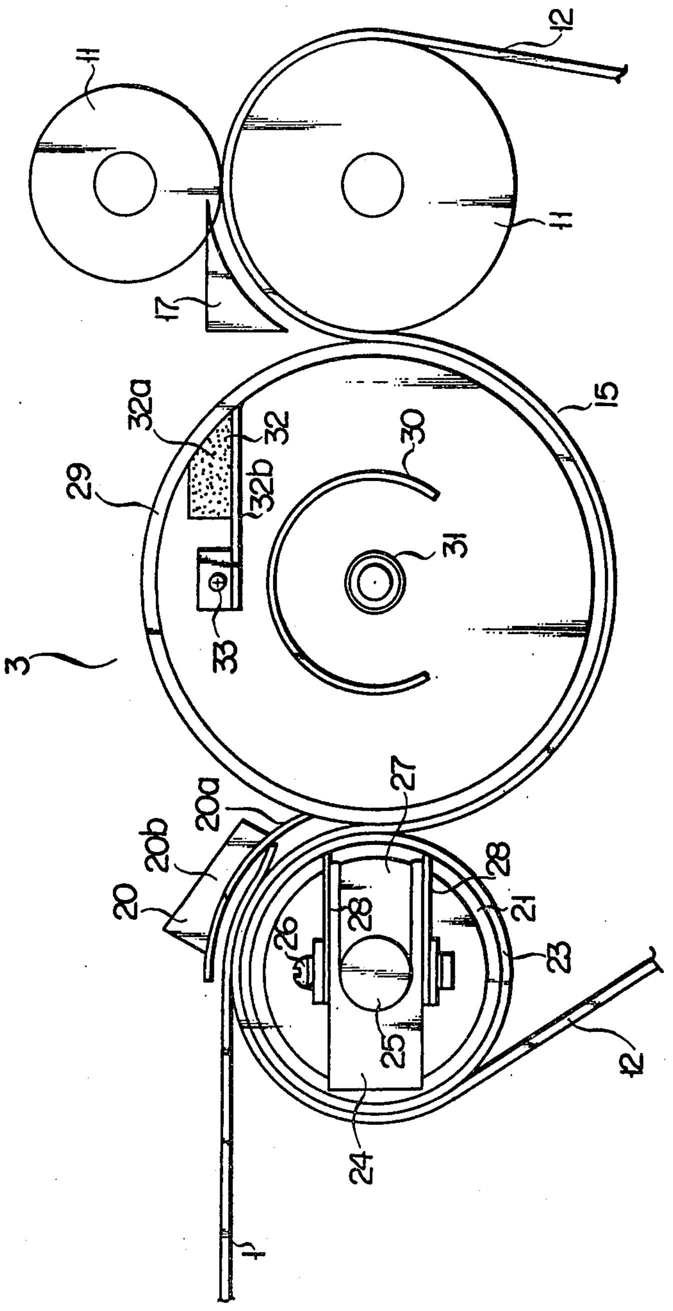
FIG. 3 is a schematic, partially enlarged view of the device shown in FIG. 2.
Figure 4:
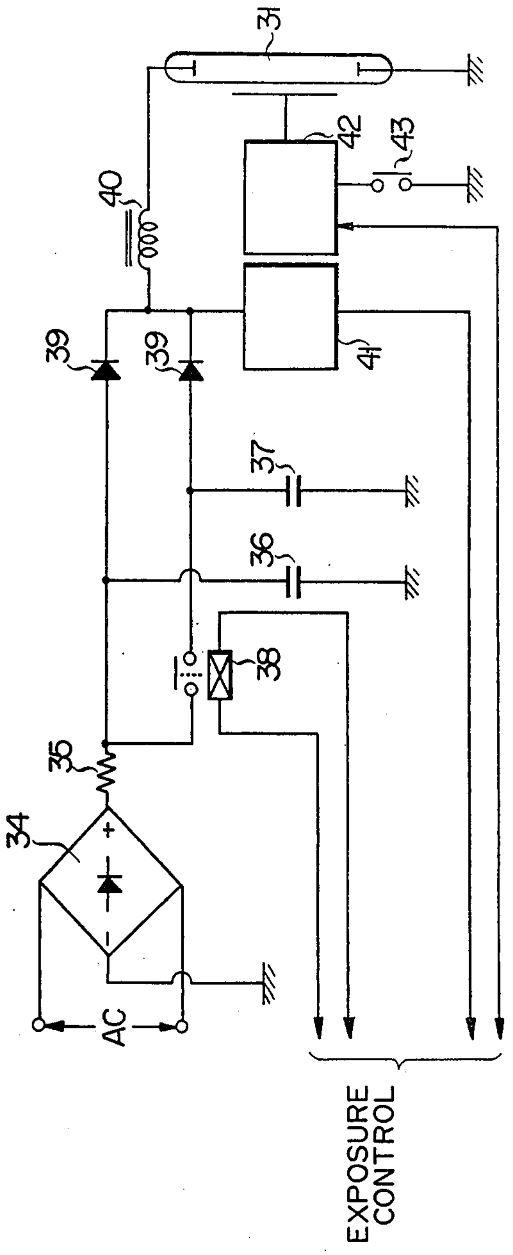
FIG. 4 is a partial circuit diagram of the device shown in FIG. 2.

The exposing part 3 comprises, as shown in FIG. 3, a card guiding part 14 and an exposing unit 15. The card guiding part 14 comprises guiding plates 16, 17, 18, and 19, a separating pawl 20, a suction roller 21 and a separating roll 22. The separating pawl 20 in turn comprises a plastic film 20*a* and a film holder 20*b*. The suction roller 21 comprises a roller body 23 with through holes and a suction chip 24 for suction through the through holes of the roller body 23. The roller body 23 is rotatable with respect to the chip 24 which is stationary. The chip 24 communicates with a vacuum device (not shown) through a pipe 25. The chip 24 is secured by a screw 26, and its open end 27 opposes the exposing unit 15. Numeral 28 denotes a sealing plate for securely holding the open end 27 toward the roller body 23. The separating roll 22 is reversible in its direction of rotation. The exposing unit comprises a drum 29 of a transparent body such as quartz glass, a mirror 30 disposed inside this drum 29, a xenon lamp 31, and a cleaning pad 32 for cleaning the inside surface of the drum 29. The cleaning pad 32 is so constructed that a member 32*a* of a material such as felt is secured to a mounting member 32*b* so that the member 32*a* may slidably contact the drum 29 as needed by turning a screw 33. The xenon lamp 31 is turned on by a circuit as shown in FIG. 4.

A DC current is supplied through a rectifying circuit 34 and is made to have a suitable value by a charging resistance 35. Capacitors 36 and 37 are charged until the voltage reaches a predetermined value. When a relay 38 is not in operation, a circuit for charging the capacitor 37 is opened, so that the capacitor 37 is not charged. Numeral 39 denotes a backward current preventive diode and 40 denotes a choke coil. A charge detecting circuit 41 detects the charged conditions of the capacitors 36 and 37. A triggering circuit 42 generates a signal for triggering the xenon lamp 31. Numeral 43 denotes a manually operated switch to be used for turning on the xenon lamp 31 for a test. This switch 43 is capable of turning on the lamp 31 independently of the control supplied by a control part to be described later.

The printing part 4 comprises a thermal head 44 and a platen roller 45.

The magnetic recording part 5 comprises magnetic heads 46R and 46W and a press roller 47, and is capable of recording on the magnetic recording layer 1*c* of the card 1 and of reading out the recorded information for comparison so as to prevent erroneous recording.

Figure 5:
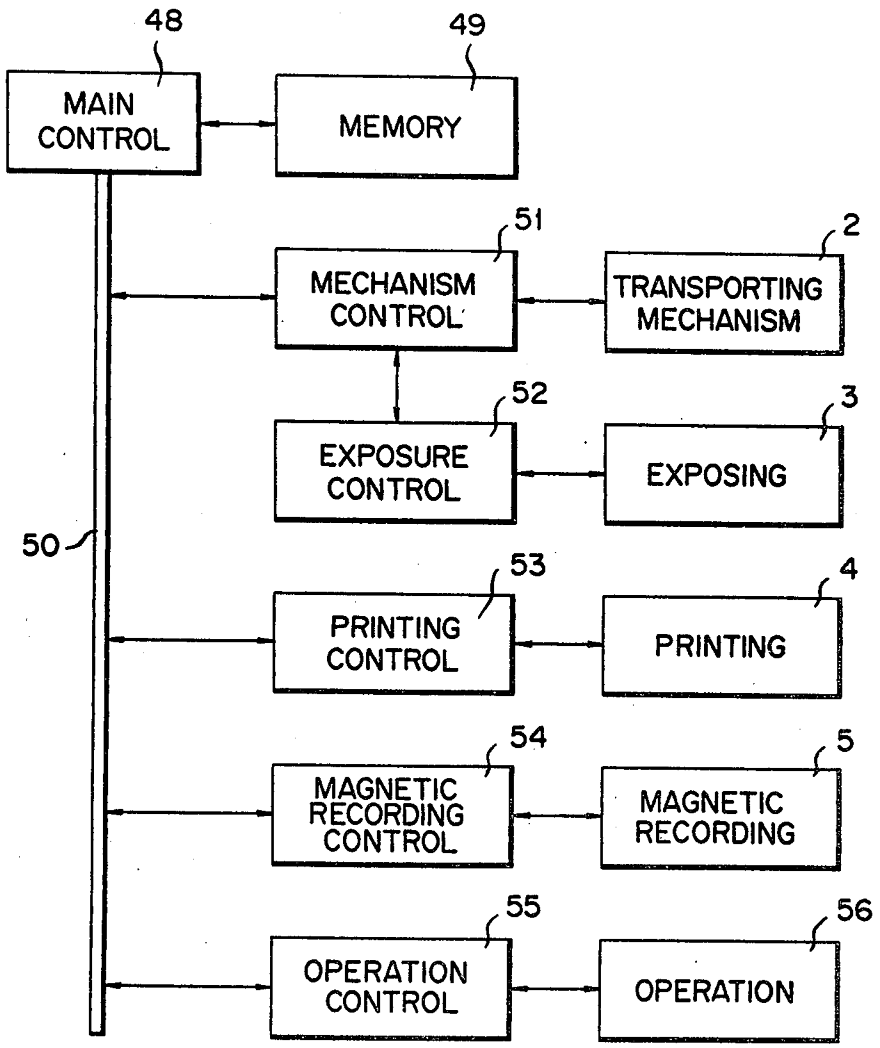
FIG. 5 is a block diagram of the mechanism of the device shown in FIG. 2.

The device of the construction described above is controlled by a control part as shown in FIG. 5.

A main control part 48 has as its main component a processor such as a microprocessor and controls the operation order of the devices according to a program stored in a memory 49. The memory 49 also stores the character patterns which are necessary for printing. A required control signal from the main control part 48 is supplied through a bus line 50 to a mechanism control part 51, an exposure control part 52, a printing control part 53, a magnetic recording control part 54 and an operation control part 55. These control parts 51–55 are individually operated according to the control signals supplied from the main control part 48 for individually controlling the card supplying and transporting mechanism 2, the exposing part 3, the printing part 4, the magnetic recording part 5 and an operating part 56, respectively. The operating part 56 is for inputting the issuing conditions such as departing and terminating stations, valid periods and so on.

In FIG. 2, symbols $SC_1$–$SC_5$ denote detectors for detecting the arrival and presence of the card 1. The detecting signals from these detectors $SC_1$–$SC_5$ are sent to the mechanism control part 51.

The operation of the device of the above construction will now be described.

In response to the operation of an issuing button (not shown) of the operating part 56, an issuing signal is supplied from the operation control part 55 to the main control part 48 through the bus line 50. One card 1 is pooled in the transporting part 10 when the ticketing machine is turnd on.

The main control part 48 renders the card supplying and transporting mechanism 2 operable through the mechanism control part 51, and it supplies the card 1 in the transporting part 10 to the exposing part 3. The card 1 is then detected by the detector $SC_2$, and the detecting signal is supplied to the main control part 48 through the mechanism control part 51. The main control part 48 then generates a feeding instruction. The picker 8 is driven and the card 1 encased in the hopper 6 is forwarded to the transporting part 10. The detector $SC_1$ detects that the card 1 is in the transporting part 10. The card 1 is waiting for another issuing signal. The card 1 forwarded to the exposing part 3 is clamped by the drum 29 and the belts 12 and optically activated by passing the exposing unit 15. That is, in response to a signal from the detector $SC_2$, the main control part 48 instructs the exposure control part 52 to execute an exposure routine. After a predetermined period of time has elapsed from the detection of the card 1 by the detector $SC_2$, the triggering circuit 42 is activated to turn on the xenon lamp 31. The relay 38 is not operating, and charging of the capacitor 37 is not being effected in this instance so that the amount of light emitted from the xenon lamp 31 is relatively small. When the triggering instruction is supplied to the triggering circuit 42 and the charge detecting circuit 41 is detecting the charging in the capacitor 36, this signal is supplied to the exposure control part 52 to effect a retrigger to prevent erroneous flashing. When the optical activation is effected in this manner, the card 1 is drawn by the suction roller 21 and guided by the separating pawl 20 and is separated from the drum 29. The card 1 is then clamped by the suction roller 21 and the rollers 11 and transported to the printing part 4 by the separating roll 22 (rotating in the clockwise direction in this instance). The supplied card 1 is detected by the detector $SC_3$, and the detection signal is supplied to the mechanism control part 51. Printing is initiated in response to this signal. That is, by the operation of the operating part 56, pieces of printing information such as the departing and terminating stations, the valid period and so on are read out from the memory 49 and stored in the printing control part 53 in advance. This printing information is printed in order as the card 1 is being transported. The thermal head 44 is, for example, a dot-type thermal head in which heat generating elements are arranged in one line with the density of 7 dots/mm. This thermal head makes the heat generating elements selectively generate heat according to the corresponding information to perform the heat-sensitive recording. The card 1 is transported as it is pressed toward the thermal head 44 by the press roller 45 and reaches the detector $SC_2$ by being guided again by the guiding plates 16 and 17. In response to a signal from the detector $SC_2$, the exposing part 3 effects the photofixing. The capacitors 36 and 37 are charged by operating the relay 38 in advance, and the xenon lamp 31 is turned on when a signal is supplied to the triggering circuit 42 of the exposing part 3 from the exposure control part 52 at the time when the card 1 passes the exposing unit 15 (a constant period of time after passing the detector $SC_2$, determined by the transporting speed of the belts 12 and so on and the transporting distance from the detector $SC_2$). The amount of light emitted is greater in proportion to the degree of optical activation. When the photofixing is thus effected, the card 1 is separated by the suction roller 21 and the separating pawl 20 from the drum 29 to be supplied to the separating roll 22. In this instance, the separating roll 22 is rotating counterclockwise and operates so as to supply the card 1 to the magnetic recording part 5. When the card 1 is guided by the guiding plate 18 and supplied to the magnetic recording part 5, it is detected by the detector $SC_4$. Then the magnetic encoding information corresponding to the information printed by the printed part 4 is supplied from the memory 49 to the magnetic recording control part 54. In response to this information, the control part 54 makes the head 48W magnetically record information on the card 1 and makes the head 48R read out the recorded information for comparison. If the magnetic recording has been performed correctly and is confirmed by the comparison, a commutation ticket as shown in FIGS. 1(*b*) and 1(*c*) is issued. If the magnetic recording has not been performed correctly, the ticket is collected to a collecting box (not shown) and the ticket is not issued. The detector $SC_5$ detects the passage of the card 1 and signals the completion of the issuance of the ticket through the mechanism control part 51 to the main control part 48. The main control part 48 is thus prepared to issue another signal.

Although this recording material is formed in advance in card form, a roll-shaped recording material may be used for cutting and recording as needed. Further, the thermal head may be a hot printing plate instead of the dot-type thermal head.

In summary, in accordance with the present invention, it is possible to obtain a clear and stable image even when the amount of heat energy for the heat-sensitive recording light and the amount of heat energy for photofixing are small. Optical activation and photofixing may be also performed with precision with small amounts of light by using light of 400–500 nm in wavelength for optical activation and light of 300–450 nm in wavelength for photofixing. It is also possible to perform the optical activation and the photofixing using a single light source by changing the energy in each instance.

In the method for fixing a heat-sensitive recording as described, the recording material was made to pass around the exposing unit twice for the optical activation and the photofixing so that the device may be made compact in size. Further, since the image is fixed, alteration, fading and so on of the recorded information may be prevented.

What we claim is:

1. A heat-sensitive recording apparatus for performing heat-sensitive recording of information on a heat-sensitive recording sheet having on its surface a heat-sensitive layer containing a diazo compound and a coupling agent, which apparatus comprises:

a thermal head comprising a plurality of heating elements for selectively heating the heat-sensitive layer corresponding to given information to be recorded;

a photofixing system for photofixing the information recorded by the heating through the thermal head, which comprises a light emitting part for uniformly irradiating light over all the surface of the heat-sensitive recording sheet;

a transporting means for passing the heat-sensitive recording sheet through a heating means including the thermal head and through a light-irradiating means including the photofixing system; and a preactivating system for optically activating said heat-sensitive layer before performing a heat recording.

2. The head-sensitive recording apparatus according to claim 1, wherein the color-fixing means includes a means to irradiate an ultraviolet ray.

3. The heat-sensitive recording apparatus according to claim 1, wherein said recording material has a substrate comprising a photocuring resin which can be cured with the light irradiated by the color-fixing means.

4. The heat-sensitive recording apparatus according to claim 1, wherein a light source in the color-fixing means is a tubular lamp.

5. The heat-sensitive recording apparatus according to claim 1, wherein a light source in the color-fixing means is a flash lamp.

6. The heat-sensitive recording apparatus according to claim 1, wherein a light source in the color-fixing means is housed within a transparent cylindrical body.

7. The heat-sensitive recording apparatus according to claim 6, wherein the transparent cylindrical body is made of glass.

8. The heat-sensitive recording apparatus according to claim 6, wherein the color-fixing means comprises a transparent cylindrical body and an endless belt being transferred by the rotation of the cylindrical body for transporting the recording material by holding it therebetween, and the color-fixing is performed during the transportation of the recording material.

9. The heat-sensitive recording apparatus according to claim 1, wherein the photofixing system comprises a belt adapted to be shifted along an outer surface of a transparent drum and to pass the heat-sensitive recording sheet between the belt and the transparent drum.

10. The head-sensitive recording apparatus according to claim 1, wherein said transporting means comprises an endless belt passing through the heating means and the light-irradiating means, which forwards the heat-sensitive recording sheet to the light-irradiating means both before and after passing it through the heating means.

11. A heat-sensitive recording apparatus for performing heat-sensitive recording of information on a heat-sensitive recording sheet having on its surface a heat-sensitive layer containing a diazo compound and a coupling agent, which apparatus comprises:

a thermal head comprising a plurality of heating elements for selectively heating the heat-sensitive layer corresponding to given information to be recorded;

a photofixing system for photofixing the information recorded by the heating through the thermal head, which comprises a light emitting part for uniformly irradiating light over the entire surface of the heat-sensitive recording sheet;

a transporting means for passing the heat-sensitive recording sheet through a heating means including the thermal head and through a light-irradiating means including the photofixing system; and a magnetic recording means for magnetically recording information on the recording sheet.

* * * * *